Dec. 19, 1950 P. W. WADSWORTH 2,534,564

RINGER TEST CIRCUIT CONTROLLED FROM STATION UNDER TEST

Filed Oct. 29, 1948 3 Sheets-Sheet 1

INVENTOR
P.W. WADSWORTH
BY P. C. Smith
ATTORNEY

Dec. 19, 1950 P. W. WADSWORTH 2,534,564

RINGER TEST CIRCUIT CONTROLLED FROM STATION UNDER TEST

Filed Oct. 29, 1948 3 Sheets-Sheet 2

INVENTOR
P. W. WADSWORTH
BY P. C. Smith
ATTORNEY

Dec. 19, 1950 P. W. WADSWORTH 2,534,564

RINGER TEST CIRCUIT CONTROLLED FROM STATION UNDER TEST

Filed Oct. 29, 1948 3 Sheets-Sheet 3

INVENTOR
P. W. WADSWORTH
BY P. C. Smith
ATTORNEY

Patented Dec. 19, 1950

2,534,564

UNITED STATES PATENT OFFICE 2,534,564

RINGER TEST CIRCUIT CONTROLLED FROM STATION UNDER TEST

Paul W. Wadsworth, Garden City, N. Y., assignor to Bell Telephone Laboratories, Incorporated, New York, N. Y., a corporation of New York Application October 29, 1948, Serial No. 57,393

6 Claims. (Cl. 179—175.2)

This invention relates to telephone systems in which connections between subscribers' lines are established by automatic switching equipment and more particularly to a test trunk circuit for enabling an outside repair man to test the ringer at a substation of a line from which substation he may initiate a test.

Trunk circuits of the type to which the present invention is directed are particularly applicable to a telephone system of the so-called cross bar type disclosed in the application of A. J. Busch Serial No. 57,394 filed concurrently herewith.

When a repair man has completed adjustments or repairs of a subscriber's substation apparatus, it is the usual practice to test the subscriber's station apparatus either by requesting a call from a test desk operator at the central office or by dialing a connection to a test trunk circuit at the central office which is provided with the necessary equipment to automatically test the substation apparatus including the ringer.

In some exchange areas, subscribers' lines of many different types may terminate in the same office. These lines may be individual lines, two-party lines, four-party semiselective lines, four-party full selective lines, eight-party semiselective lines or ten-party five code lines. If the repair man is to be enabled to test the substation apparatus on a line of any of these various types, it is essential that if he dials a connection with a test trunk, that the test trunk be provided with means to apply the proper type of ringing to operate the ringer at the substation under test.

It is therefore an object of the present invention to provide improved automatic testing equipment at a central office which may be selected by dial operation at the substation under test.

It is a further object of the invention to provide means responsive to the dialing of the numerical digits of the directory number of the substation from which a test call is originated, to cause the application of the proper type of ringing to operate the ringer of the calling substation.

These objects are attained in accordance with the present invention by the provision of a small group of test trunk circuits, an idle one of which may be seized and connected to a calling line in response to the initiation of a test call from a substation on the line by a repair man. To cause the selection of the test trunk circuit, the repair man dials the digits of a special office code, indicative of the fact that he desires to make a test of the substation ringer, followed by the numerical digits of the assigned directory number of the substation under test. The marker recognizes the special office code as a call for the test trunk circuit and the numerical digits give the marker the necessary information for identifying the type of ringing to be set up on a ringing selection switch associable with the test trunk circuit. When the trunk circuit is cut through to the subscriber's station, a loud tone is placed on the line to inform the test man that the line has been cut through and to interfere with any other subscribers whose substations are on the same line conversing with each other. The trunk circuit is set for ringing by either dialing any arbitrary digit into the trunk circuit or by flashing the switchhook. When the repair man hangs up, the selected ringing current is connected to the line and continues until the repair man again lifts the receiver from the switchhook when ringing is tripped and the tone current is reapplied to the line. If the repair man desires to repeat the ringing test, he dials a digit again or flashes the switchhook and following the restoration of the receiver to the switchhook the selective ringing current is reapplied to the line until the receiver is again removed from the switchhook. When the tests have been completed, the restoration of the receiver to the switchhook without dialing or flashing the switchhook will result in the restoration of the trunk circuit and the release of the connection to the trunk circuit.

The novel features of the invention are set forth in the appended claims and the invention as to its organization and its mode of operation will be best understood from the following detailed description when read in connection with the drawing in which:

Figure 1:
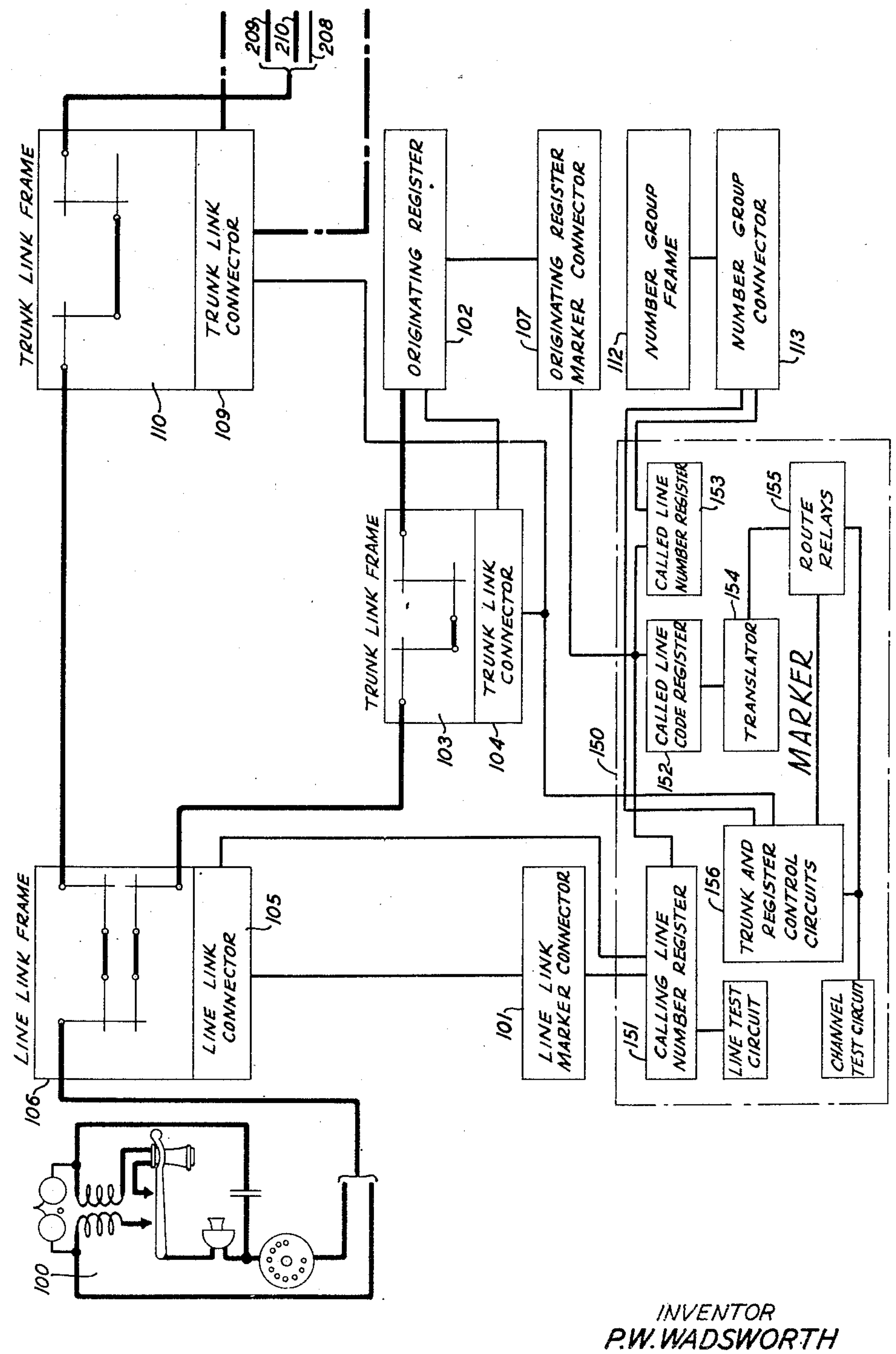
Fig. 1 shows schematically the equipment of an office of the cross bar type by which a calling line may be connected to a station ringer test trunk circuit.
Figure 3:
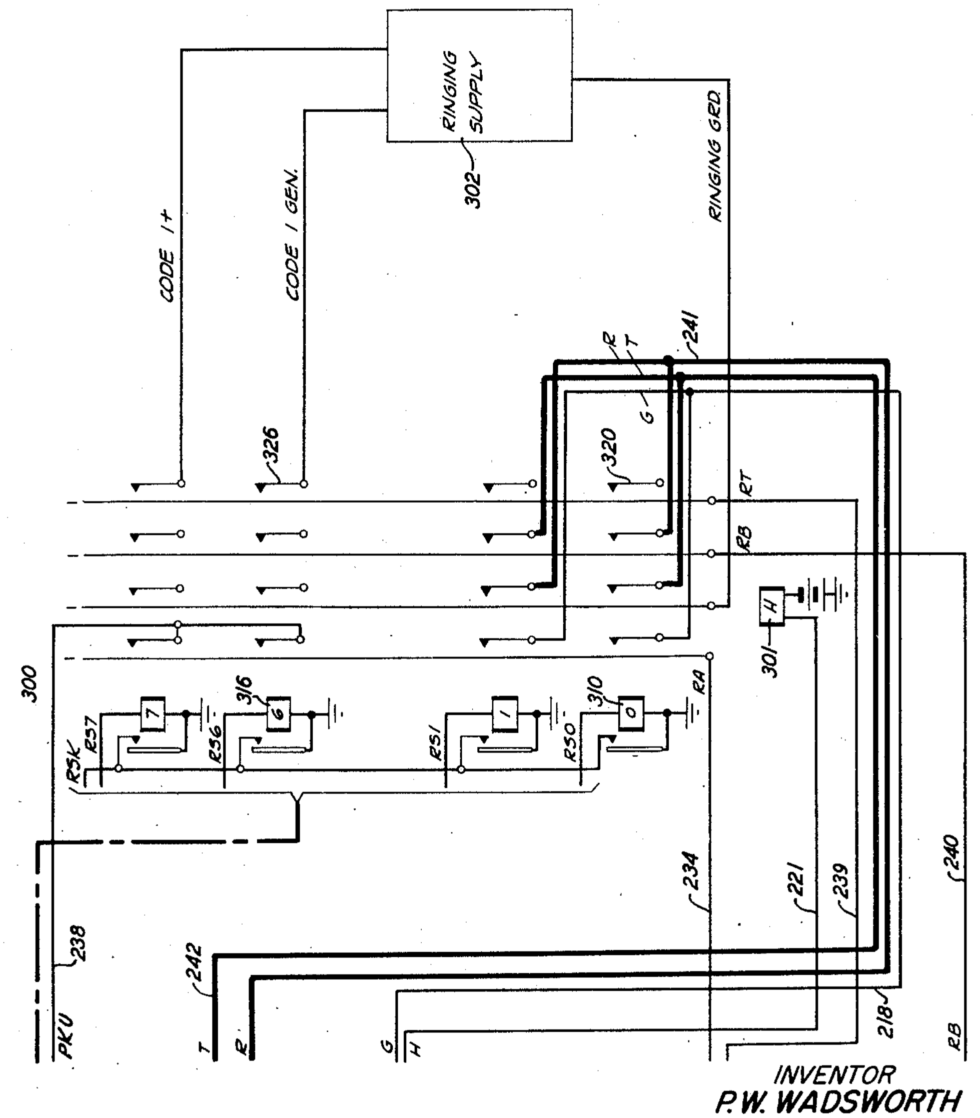
Fig. 3 shows a ringing selection switch circuit selectively operable to select the type of ringing required for operating the ringer at the substation of a line from which the test call has been initiated by a test or repair man and for connecting the selected ringing current source to the test trunk circuit.

The switches schematically disclosed in the boxes of Fig. 1, labeled Line link frame and Trunk link frame and the ringing selection switch of Fig. 3 are of the well-known cross bar type, such as is disclosed for example, in Patent No. 2,021,329 granted November 19, 1935 to J. N. Reynolds.

Figure 2:
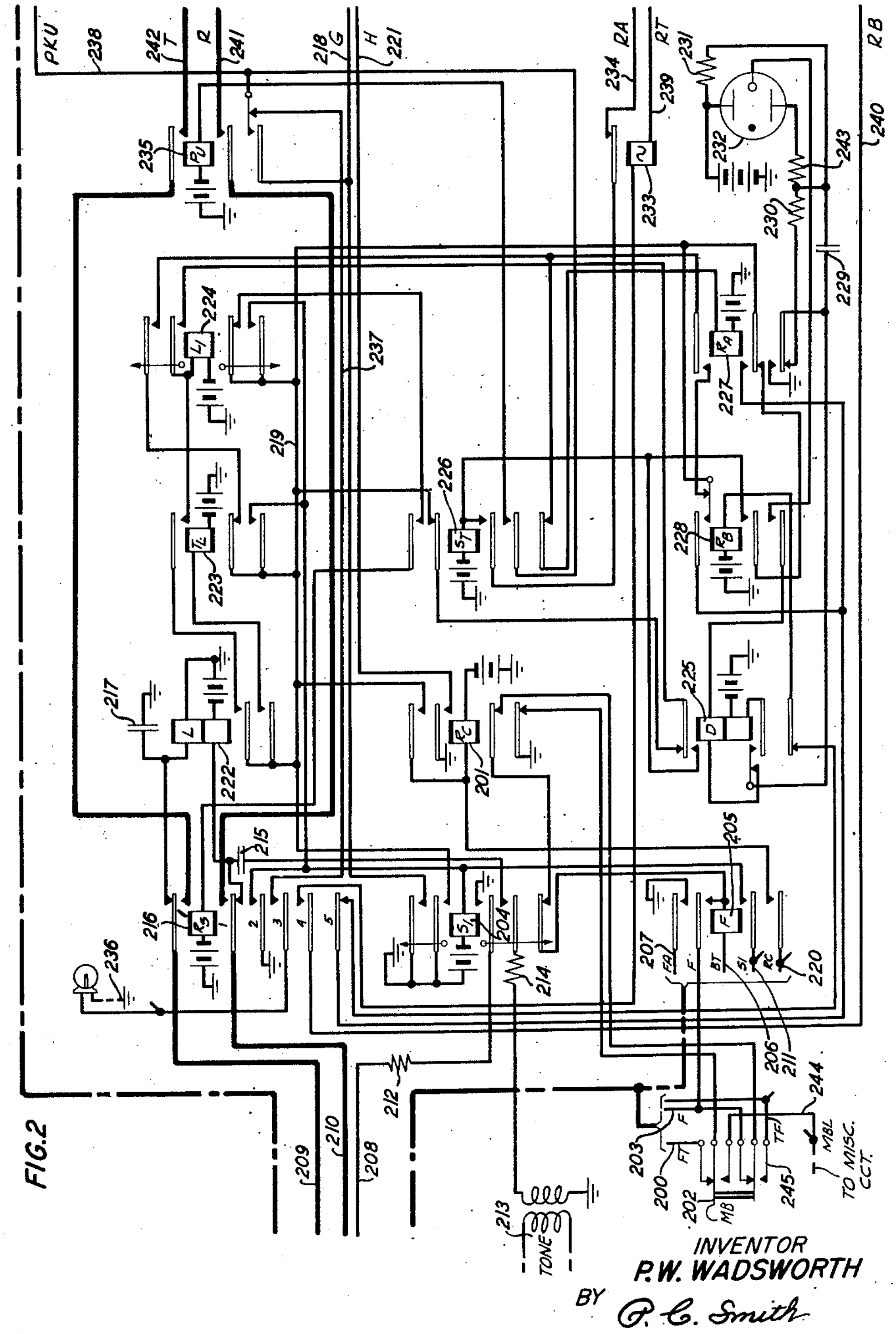
Fig. 2 shows a station ringer test circuit.

In the switch of Fig. 3, the select magnets are selectively operable from the marker in accordance with the setting of the number group to determine the type of ringing required for a specific connection and the hold magnets are individualized to ten trunk circuits, one of which may be a test circuit of the type disclosed in Fig. 2 to which the ringing selection switching circuit of Fig. 3 is common. A ringing selection switch circuit of the type disclosed in Fig. 3 is more fully disclosed and described in the application of M. C. Goddard Serial No. 57,386 filed concurrently herewith. The circuits and apparatus schematically disclosed in Fig. 1 of the drawing are fully disclosed and described in the application of A. J. Busch hereinbefore referred to.

The invention will now be considered in detail. It will be assumed that a repair man at the substation designated 100 in Fig. 1, initiates a call whereupon a connection is established from the line link frame 106, on which the calling line terminates, to an idle marker 150. Access to the marker is gained through the line link marker connector 101 which connects only such leads as are necessary to identify the line link frame to the marker by its frame number and to inform the marker that a dialing connection is to be established. The marker 150 then proceeds through its trunk and register selection control circuits 156 to select an idle originating register, such as is schematically disclosed by the box 102, which will later serve to transmit a dial tone to the calling line and to receive dial pulses.

Originating registers are distributed over the trunk link frames. By means of test leads extending from the registers to the marker, the marker determines which trunk link frames have idle registers and which frames are not being used by other markers. It then preferentially selects an idle frame with idle registers and connects to the frame through the trunk link connector. The marker then preferentially selects an idle register and connects to it. It will be assumed that the originating register 102 is idle and is accessible from the idle trunk link frame 103 which frame is connected to the marker through the trunk link frame connector 104.

The location of the calling line is begun as soon as the marker is seized and continues while the marker is selecting an idle register. Line location is made in terms of the line link frame, the vertical group, the horizontal group and the vertical file. Following marker seizure, the marker determines which vertical group contains the line awaiting service. The vertical group contains a maximum of fifty subscribers' lines, therefore the determination of the vertical group localizes the subscribers' lines as within fifty of the maximum of 690 lines terminating on the frame.

A line link horizontal group of subscribers' lines is one switch high and the width of the supplied line of switches, the maximum width being that of a frame containing fourteen vertical groups. The marker determines which horizontal group has one or more lines within the selected vertical group awaiting service and the marker then preferentially selects one group. The line to be served has now been located within five lines as determined by the selected vertical and horizontal groups.

Line location does not proceed past the horizontal group selection until the marker has seized the trunk link frame. Following trunk link frame seizure, the marker seizes the line link frame 105 which has identified itself through its marker connector 101 whereby leads are extended to the marker for vertical file identification and for completing connection to the frame. A line link vertical file of subscribers' lines is one vertical wide and ten switches high. Thus one vertical group contains five vertical files. The marker tests the five lines found in the vertical file in which the calling line is located and if more than one line are awaiting service, the marker preferentially selects one. The marker then transmits the line link frame number and the selected line location to the originating register.

After the horizontal group has been determined and an originating register seized, the marker selects one of ten channels which may be used to connect the calling line to the register. The marker tests the junctor, line link and trunk link in each channel to see what junctors or links are already in use on other calls. The lowest numbered available channel is chosen and the marker operates the select and hold magnets on the line link and trunk link frames to establish the channel. It has been assumed that the selected channel extends over the line link frame 106 and the trunk link frame 103. When the channel is selected, the marker indicates to the register the number of the line link used in the channel and the register stores this information for future use.

After the channel has been established and checked, the marker releases leaving in the register the line link frame number, calling line location and the line link number used in the dialing connection to the register 102.

The repair man then receives a dialing tone from the selected originating register after which the repair man proceeds to dial the digits of a special test code and the digits of the assigned line number of the substation at which he is making repairs, which digit impulses are registered in the originating register. After the entire number has been dialed, the register calls in a marker over the originating register marker connector 107. As soon as a marker has been connected to the register, the register proceeds to transmit to the marker the calling line link frame location which is then registered in the calling line number register 151 of the marker, the digits of the special test code number which are registered in the called office code register 152 of the marker and the numerical digits of the calling line number which are registered in the called line number register 153 of the marker. From the called office code register 152, the marker proceeds through the translator circuit 154 to determine the routing of the desired connection thereby resulting in the operation of a route relay in the group of route relays 155. It will be assumed that in the case under consideration the operated route relay is effective to control the setting up of a connection from the subscriber's line 100 to the station ringer test trunk circuit shown in Fig. 2.

To accomplish this, the marker seizes an idle trunk link frame which has idle ringer test trunk circuits. It will be assumed that the trunk link frame 110 is seized over the trunk link connector 109 and connects to an idle ringer test trunk circuit, for example the trunk circuit shown in Fig. 2.

While trunk selection is taking place, the marker seizes the number group frame 112 over the number group connector 113 and passes the numerical digits of the calling line number to it from the called line number register 153. The number group gives the marker information for setting the ringing selection switch for ringing the substation on the calling line. The trunk appears on a vertical file of the switch and different ringing codes appear on the horizontals. The marker after receiving the required information from the number group, operates the selected hold magnet to connect the proper individual or party line ringing into the trunk. The marker then disconnects and leaves the switch held by the trunk circuit.

After the marker has seized an idle station ringer test trunk circuit, it seizes the line link frame 106 on which the calling line terminates and selects an idle channel between the trunk circuit and the calling line. The dialing connection previously established is not released until the marker determines that an idle channel exists between the calling line and the trunk circuit.

The marker has recorded the number of the line link used in establishing the dialing connection to the originating register 102 and may therefore reuse that line link as part of the originating connection if the link is part of the lowest numbered available channel. The marker then proceeds to operate the select and hold magnets on the line link and trunk link frames 106 and 110 to establish a connection from the calling line 100 to the test trunk circuit of Fig. 2, over the selected channel. The marker now becomes disconnected and releases the originating register 102.

It has been assumed that the marker 150 has through the trunk line connector 109 been directed to the trunk link frame 110 on which an idle station ringer test trunk circuit terminates. There is a frame test (FT) lead 200 for each trunk link frame on which test trunk circuits appear and each idle trunk circuit supplies ground from the lower back contact of the RC relay 201, over the upper normal contacts of the make busy key 202 to such test lead. The marker has access to the test leads, such as 200, through the trunk link connector 109 and knows that there is at least one idle trunk circuit on each frame corresponding to a grounded lead 200. The marker then proceeds to select one of the frames with available trunk circuits and supplies ground on the frame (F) lead 203 to all the station ringer test trunk circuits appearing on that frame. It will be assumed that the trunk circuit shown in Fig. 2 is one of such trunk circuits which appear on the trunk link frame 110. This ground on lead 203 is supplied over the lower normal contacts of the make busy MB key 202, over the inner lower back contact of the RC relay 201, over the lower back contact of the S1 relay 204 and to the right terminal of the winding of the F relay 205 of each trunk circuit that is idle. The marker determines which of the trunk circuits are idle while looking for this ground through the windings of the F relays and over the busy (BT) lead 206 selects one of the idle trunk circuits. These trunk link frames and trunk circuit selections are carried out by the marker in the same general manner as the originating register selections previously referred to.

When a marker selects a trunk circuit, for example the one disclosed in Fig. 2, it applies battery to the individual BT lead 206 thereby operating the F relay 205 of such trunk circuit. Relay 205 upon operating locks over its inner upper contacts, over lead 203 to ground at the marker. When the marker selects the trunk link frame 110 on which the trunk circuit of Fig. 2 appears, it locks out all other markers from such frame until the marker has completed setting up the connection.

Relay 205 upon operating connects ground over its upper contacts to the FA lead 207 extending to the trunk link connector 109 for determining the cross-point in a horizontal level of a switch on the trunk link frame 110 where the appearance of the trunk circuit is located. The connection of ground to the FA lead 207 causes the operation of an FA relay (not shown) in the trunk link connector 109, which in turn causes the operation of a level LV relay (not shown) in the trunk link connector. The operation of the FA relay performs the necessary functions in conjunction with the marker to set up the connection between the calling line 100 and the trunk circuit. One of these functions is the transfer of the sleeve (S) lead 208 to the marker for testing and the tip conductor 209 and ring conductor 210 of the trunk circuit to the marker for continuity checks. In addition, the operation of the LV relay of the trunk link connector establishes a circuit from the marker to the S1 lead 211 of the trunk circuit, thence over the inner lower contacts of the F relay 205 and through the winding of the S1 relay 204 to battery and ground so that the marker causes relay 204 to operate.

The marker at this time operates the select magnets on the trunk link frame 110 preparatory to cutting the connection through from the calling line to the trunk circuit, the connection being held after cut-through by ground applied to the sleeve 208 of the trunk circuit through resistor 212 and over the inner lower contacts of operated relay 204. Relay 204 upon operating also applies tone current from the tone source 213 through resistor 214, over the lower front contacts of relay 204, through condenser 215 and over the lower No. 1 back contact of the RS relay 216 to ring conductor 210 of the trunk circuit. Over its upper contacts relay 204 supplies ground over the G lead 218 to the ringing selection switch of Fig. 3 and connects operating ground over its inner upper contacts and conductor 219 to contacts of several relays of the trunk circuit.

After the marker has operated the select magnets to cut through the connection, it connects ground to the RC lead 220 and, with the F relay 205 operated, the circuit of the RC relay 201 is completed and relay 201 operates and locks over its upper contacts to ground on conductor 219. At its lower back contact relay 201 removes ground from the FT lead 200 so that if all the trunk circuits on the trunk link frame become busy, the FT lead 200 will not be grounded and the trunk link frame will test busy to any marker. When relay 204 operated, it made the trunk circuit busy by opening the F lead 203 at its lower back contact thereby opening the initial operating circuit of the F relay 205. Relay 201 also upon operating opens the circuit of relay 205 at its inner lower back contact.

In the meantime, the marker has received information from the number group frame 112 concerning the type of ringing required to ring back over the calling line to operate the ringer at the substation where the repair man is testing. It will be recalled that the number group frame has for this purpose received the numerical digits allocated to the substation from which the call has been made, which digits were dialed by the repair man. In accordance with this information supplied to the marker, the marker has operated select magnets of the ringing selection cross bar switch 300 of Fig. 3 allocated to the trunk circuits appearing on the trunk link frame 110. It will be assumed that for ringing the calling substation 100 the marker completes the circuit through the trunk link connector 109 and through the winding of select magnet 316 to ground to enable the application of negative superimposed ringing for two seconds followed by a four-second silent interval and also establishes a circuit for the number 0 select magnet 310.

When the RC relay operates as previously described, it applies ground over its inner upper contacts and the H lead 221 to the winding of the hold magnet 301 whereupon such magnet operates and with select magnets 310 and 316 operated the cross-point contact sets 320 and 326 of the vertical row allocated to the trunk circuit of Fig. 2 become operated.

When the marker has completed its functions for this call, it releases the F relay 205 of the trunk circuit thereby opening the F, FA, RC and S1 leads 203, 207, 220 and 211. The removal of ground from lead 207 causes the cut-through of the connection between the calling line and the trunk circuit whereupon a circuit is established from battery through the lower winding of the L relay 222, over the lower No. 1 back contact of relay 216, ring conductor 210 of the trunk circuit, over the ring of the established connection, over the loop at the calling substation 100, returning over the tip of the established connection, tip conductor 209 of the trunk circuit, upper back contact of relay 216 and to ground through the upper winding of relay 222. Relay 222 operates over this circuit and over its lower contacts establishes a circuit from ground on conductor 219 through the winding of the TL relay 223 to battery whereupon relay 223 operates and establishes a circuit from ground on conductor 219, over the inner contacts of relay 222 and the upper contacts of relay 223 through the winding of the L1 relay 224 to battery. Relay 224 thereupon operates and locks over its inner upper contacts, the upper back contact of the D relay 225, the upper back contact of the ST relay 226 and to ground on conductor 219.

The removal of ground from the S1 lead 211 opens the initial operating circuit for the S1 relay 204 but relay 204 being slow to release does not release prior to the operation of relays 222, 223 and 224 as just described and the reestablishment of a new holding circuit for relay 204 extending through its winding over the lower contacts of relay 223 or of relay 224 to ground over the inner upper contacts of relay 204.

The connection being now cut through to the subscriber's substation under test, the repair man may hear the loud tone applied to ring conductor 210 of the trunk circuit, transmitted over the established connection and returning over tip conductor 209 of the trunk circuit, the upper back contact of relay 216 and through condenser 217 to ground as a signal that a connection has been extended to a station ringer test trunk circuit. This loud tone on the calling line is also effective to interfere with any other subscribers having substations on the same line conversing with each other while the tests are being conducted by the repair man. If the call is abandoned at this time and the repair man hangs up, the circuits will restore as later described.

To set the trunk circuit for ringing the repair man now dials a digit or flashes the switchhook.

On the first opening of the calling line loop, the L relay 222 releases followed by the release of the TL relay 223, but the L1 relay 224 being locked up, does not release and therefore a circuit is established from ground on conductor 219, over the back contact of relay 223, the upper contacts of relay 224, the lower back contact of relay 226 and through the winding of the RA relay 227 to battery and ground. Whereupon relay 227 operates and locks over a circuit extending over the lower back contact of relay 226, the upper contacts of relay 227, the upper normal contacts of the RB relay 228 and to ground on conductor 219 and thus relay RA remains operated long enough to insure the operation of the RB relay 228 on a short impulse. The operating circuit for relay 228 extends from ground on conductor 219, over the inner lower front contact of relay 227, the lower No. 5 back contact of RS relay 216, the lower back contact of the D relay 225 and through the winding of relay 228 to battery. Relay 228 upon operating locks over its upper alternate contacts to ground on conductor 219 so that it will remain operated following the release of relay 227 and, at its upper normal contacts, opens the locking circuit of relay 227 so that relay 227 will release upon the termination of the short-opening of the calling line loop.

Relay 227 upon operating also opens at its lower back contact the discharge path for condenser 229 extending through resistor 230, over which path the condenser has become fully discharged, and establishes a charging path for condenser 229 extending from ground over the lower front contact of relay 227 through the condenser and resistor 231 to the +130-volt battery and the condenser 229 thereupon starts to charge. If the line loop is now reclosed within two seconds, which it should be in response to the release of the switchhook or the reclosure of dial contacts upon the return of the dial to normal, the L relay 222 will reoperate followed by the reoperation of the TL relay 223. Since the locking circuit for the RA relay 227 has now been opened by the operation of the RB relay 228, the release of relay 223 now causes the release of relay 227 which at its lower contacts opens the charging path for condenser 229 and closes the discharge path therefor to remove the partial charge from the condenser. The partial charge on condenser 229 has not been effective to cause the firing of the gas tube 232.

With relay 228 operated and relay 227 now released, a circuit is established from ground on conductor 219, over the inner lower back contact of relay 227, the inner lower contacts of relay 228 and through the winding of the ringing start (ST) relay 226 to battery and relay 226 operates and locks over its inner lower contacts, over the back contact of the ringing trip (RT) relay 233, conductor 234 and the left contacts of the cross-point contact set 320, operated through the conjoint operation of the select magnet 310 and the hold magnet 301, to ground applied to conductor 218 by the operation of the S1 relay 204. At its lower back contact, relay 226 opens the operating circuit for the RA relay 226 to prevent the reoperation thereof and at its upper back contact opens the previously traced locking circuit for the L1 relay 224. Relay 224 however remains operated under the control of the operated TL relay 223 and L relay 222. At its upper contacts, the ST relay 226 prepares the circuit for operating the RS relay 216.

When the call is from a "one ring" line, as will be assumed, the PU relay 235 is immediately operated without awaiting the closure of the interrupter contacts at the pick-up supply 236 connectable over the lower No. 3 contacts of relay 216 to conductor 237. Relay 235 in this instance is operated over a circuit extending from battery through the winding of relay 235, over the lower front contact of relay 226, the PKU lead 238, the left contacts of the cross-point contact set 326, closed through the conjoint operation of select magnet 316 and hold magnet 301, and the left contacts of the cross-point contact set 320, closed through the conjoint operation of select magnet 310 and hold magnet 301, and thence to ground on conductor 218. Relay 235 upon operating locks over a circuit extending over the lower front contact of relay 226, over its lower alternate contacts and to ground on conductor 218. Over its upper and inner lower contacts, relay 235 now connects the tip and ring leads 242 and 241 from the ringing selection switch circuit of Fig. 3 to the upper and lower No. 1 front contacts of the RS relay 216 preparatory to the application of ringing current to the calling line. Should additional dial impulses be received at this time, the L relay 222 and the TL relay 223 will follow the impulses but the L1 relay 224 being slow to release will remain operated.

When the repair man at the subscriber's substation hangs up after flashing the switchhook or dialing a digit as previously described, relays 222 and 223 release in turn permitting the release of the L1 relay 224. With relay 226 operated as previously described, the circuit of the RS relay 216 is now completed over the lower back contact of relay 224 to ground on conductor 219 and relay 216 operates to complete the ringing circuit. When relay 216 operates it disconnects the windings of the L relay 222 from the tip and ring conductors 209 and 210 of the trunk circuit and also opens the circuit over which loud tone current was applied from the source 213. The S1 relay 204 is now held operated over the lower No. 2 contacts of relay 216. Relay 204 being slow to release will remain operated over the interval intervening between the release of the L1 relay 224 and to the operation of relay 216. Relay 216 upon operating also opens at its lower No. 5 back contact the locking circuit of the RB relay 228 and such relay now releases.

Ringing current is now connected to the substation 100 from the ringing current supply 302, over the Code 1 generator lead, the right contacts of the cross-point contact set 326, closed through the conjoint operation of select magnet 316 and hold magnet 301, over the RT lead 239, through the winding of the RT relay 233, the lower No. 4 contacts of the RS relay 216, the RB lead 240, the next-to-right contacts of cross-point contact set 320, operated through the conjoint operation of select magnet 310 and hold magnet 301, the ring (R) lead 241, over the inner lower contacts of the PU relay 235, the lower No. 1 front contact of relay 216, ring conductor 210 of the trunk circuit, thence over the ring of the established connection, through the ringer at substation 100, over the tip of the established connection, tip conductor 209 of the trunk circuit, the upper front contact of relay 216, the upper contacts of relay 235, the tip (T) lead 242 and the next-to-left contacts of the operated cross-point contact set 320 to the ringing ground connection extending to the ringing supply 302.

If the call is not for a "one ring" substation, the pick-up relay 235 does not receive a direct operating ground over the cross-point contacts of the ringing selection switch as just described but awaits an interrupter ground connection over the lower No. 3 contacts of relay 216, conductor 237, the lower normal contacts of relay 235, the lower front contacts of relay 226 and through the winding of relay 235 to battery to insure that machine ringing will not start until the beginning of a ringing code. The selection and application of the proper ringing current to signal any subscriber on a party line of any type terminating in the office may be accomplished as fully set forth in the application of M. C. Goddard Serial No. 57,386 hereinbefore referred to.

When the receiver is removed at the substation under test, or at any other substation on the line, the ringing trip relay 233 operates on the increased current flow thereby opening the locking circuit of the ST relay 226. Relay 226 now releases in turn releasing the PU relay 235 and the RS relay 216. With relays 216 and 235 now both released, the application of ringing current to the line 100 is discontinued and relay 233 now releases. The release of relay 216 reapplies the loud tone from source 213 to the calling line and reconnects the windings of the L relay 222 to the calling line whereupon relay 222 operates followed by the operation of relays 223 and 224. Relay 224 upon operating recloses the holding circuit for the S1 relay 204 to maintain the latter relay operated following the release of relay 216 and locks as previously described under the joint control of the D relay 225 and the ST relay 226. The circuits are now restored to the condition in which ringing may be reapplied to the calling station if the repair man is desirous of repeating the test and redials or flashes the switchhook and then restores the receiver to the switchhook as previously described.

When the repair man hangs up without dialing a digit or flashing the switchhook, the L relay 222 and the TL relay 223 both release but the L1 relay 224 remains operated over its locking circuit. The RA relay 227 is now reoperated in turn causing the reoperation and locking of the RB relay 228 in the manner previously described. At its lower contacts relay 227 opens the shunt around condenser 229 and closes the charging path through the condenser. Since the repair man has not dialed or flashed the switchhook but has signaled a disconnect, relay 227 remains operated so that condenser 229 becomes fully charged and the potential on the lower cathode of tube 232, applied from the +130-volt source through resistor 231 and through resistor 243, rises to a value such that the tube becomes conducting and establishes a circuit from the +130-volt source, over the cathode-anode path through the tube, over the lower contacts of the RB relay 228, through the upper winding and inner lower normal contacts of the D relay 225 and to ground over the lower contacts of the RA relay 227 and relay 225 operates. Relay 225 upon operating locks through its lower winding and inner lower alternate contacts to ground over the lower contacts of relay 227 and its lower back contact opens the locking circuit of the RB relay 228 which then releases and at its upper back contact opens the locking circuit of the L1 relay 224 which releases. Relay 225 at its inner lower alternate contacts opens the circuit traced through its upper winding and through the tube 232 thereby restoring the tube.

Relay 224 upon releasing, releases relay 227 which thereupon opens the charging path through the condenser 229 and closes the discharge path through the condenser to discharge the condenser. Relay 227 also opens the holding circuit of the D relay 225 which now releases.

Relay 224 upon releasing, opens the holding circuit for the S1 relay 204 which now releases and removes ground from sleeve conductor 208 of the trunk circuit thereby releasing the switches on the trunk link frame 110 and the line link frame 106 to release the connection between the calling line 100 and the truck circuit of Fig. 2. Relay 204 also releases the RC relay 201 which removes ground from conductor 221 thereby releasing hold magnet 301 of the ringing selection switch of Fig. 3 to restore the vertical cross-point contact sets 320 and 326 of such switch. Relays 201 and 204 now being both released, the F lead 203 is closed through the winding of the F relay 205 to the BT lead 206 and ground is reconnected to the FT lead 209 making the trunk circuit available for a new call.

The make busy key 202 is used to make the trunk circuit busy at any time. It may be operated without interfering with any call that may be in the trunk circuit because it merely opens the FT and F leads 209 and 203 which are already open if the trunk circuit is in use. When the trunk circuit is made busy and is not in use, the ground normally supplied to the FT lead 209 is applied to the MBL lead 244 to light a lamp common to the trunk circuits on the trunk link frame 110 as an indication that there is a trunk on that frame which has been made busy. The key 202 also transfers the circuit for operating the F relay 205 from the F lead 203 to the TF lead 245 whereby the marker can route a test call to a particular trunk circuit although it has been made busy. On such a call the marker will connect ground not only to lead 203 but also to lead 245.

What is claimed is:

1. In a telephone system, subscribers' substation equipments each including a ringer, a pulsing mechanism and a switchhook, a central office, lines connecting said substations with said central office, automatic switches at said central office, a ringer testing trunk circuit, a plurality of sources of ringing current, means under the control of the pulsing mechanism at a subscriber's substation for controlling the operation of said switches to connect said substation with said trunk circuit and to select one of said sources of ringing current for connection with said calling substation, and means in said trunk circuit under the control of said switchhook to repeatedly connect and disconnect said one source of ringing current to and from said line while maintaining the established connection between said line and said trunk circuit.

2. In a telephone system, subscribers' substation equipments each including a ringer, a pulsing mechanism and a switchhook, a central office, lines connecting said substations with said central office, automatic switches at said central office, a ringer testing trunk circuit, a plurality of sources of ringing current, means under the control of the pulsing mechanism at a subscriber's substation for controlling the operation of said switches to connect said substation with said trunk circuit and to select one of said sources of ringing current for connection with said calling substation, means in said trunk circuit responsive to the momentary opening and reclosure of the line at said substation either by the operation of said switchhook or the operation of said pulsing mechanism with the switchhook in the receiver-off position to connect said one source of ringing current with said trunk circuit, means in said trunk circuit thereafter responsive to the opening of the line by the operation of the switchhook to the receiver-on position to apply ringing current from said trunk circuit to said line, and means in said trunk circuit thereafter responsive to the operation of said switchhook to the receiver-off position for disconnecting said one source of ringing current from said line.

3. In a telephone system, subscribers' substation equipments each including a ringer, a pulsing mechanism and a switchhook, a central office, lines connecting said substations with said central office, automatic switches at said central office, a ringer testing trunk circuit, means responsive to the pulsing of the digits of a special office code by the pulsing mechanism at a subscriber's substation for controlling the operation of said switches to connect said substation with said trunk circuit, means responsive to the pulsing of the numerical digits of the assigned substation number for selecting that one of said sources of ringing current required to operate the ringer of the calling substation for connection with said calling substation, and means in said trunk circuit under the control of said calling substation switchhook to repeatedly connect and disconnect said one source of ringing current to and from said line while maintaining the established connection between said line and said trunk circuit.

4. In a telephone system subscribers' substation equipments each including a ringer, a pulsing mechanism and a switchhook, a central office, lines connecting said substations with said central office, automatic switches at said central office, a ringer testing trunk circuit, a plurality of sources of ringing current, means under the control of the pulsing mechanism at a subscriber's substation for controlling the operation of said switches to connect said substation with said trunk circuit and to select one of said sources of ringing current for connection with said calling substation, relay means in said trunk circuit responsive to the operation of said switchhook to repeatedly connect and disconnect said one source of ringing current to and from said line, a timing device controlled by said relay means, and means responsive to said timing device for causing the release of the connection between said line and said trunk circuit if said switchhook is maintained in a receiver-on position for a predetermined interval.

5. In a telephone system, subscribers' substation equipments each including a ringer, a pulsing mechanism and a switchhook, a central office, lines connecting said substations with said central office, automatic switches at said central office, a ringer testing trunk circuit, a plurality of sources of ringing current, means under the control of the pulsing mechanism at a subscriber's substation for controlling the operation of said switches to connect said substation with said trunk circuit and to select one of said sources of ringing current for connection with said calling substation, a start relay for controlling the connection of said selected source of ringing current to said trunk circuit, a first line relay operable in response to the connection of said trunk circuit to said substation, a secondary line relay operative in response to said first line relay and held operated under the control of said start relay, a first relay jointly controlled by said line relays and responsive to a momentary opening of the line at said substation by said pulsing mechanism or by said switchhook for causing the operation of said start relay, a second relay responsive to a reopening of said line for applying said ringing current to said line and a ringing trip relay responsive to the reclosure of said line to cause the release of said start relay whereby said source of ringing current is disconnected from said line, said relays recycling upon subsequent short openings and closures of said line to reapply and disconnect said selected ringing current to and from said line.

6. In a telephone system, subscribers' substation equipments each including a ringer, a pulsing mechanism and a switchhook, a central office, lines connecting said substations with said central office, automatic switches at said central office, a ringer testing trunk circuit, a plurality of sources of ringing current, means under the control of the pulsing mechanism at a subscriber's substation for controlling the operation of said switches to connect said substation with said trunk circuit and to select one of said sources of ringing current for connection with said calling substation, a start relay for controlling the connection of said selected source of ringing current to said trunk circuit, a first line relay operable in response to the connection of said trunk circuit to said substation, a secondary line relay operative in response to said first line relay and held operated under the control of said start relay, a first relay jointly controlled by said line relays and responsive to a momentary opening of the line at said substation by the operation of said pulsing mechanism or said switchhook for causing the operation of said start relay, a second relay responsive to a reopening of said line for applying said ringing current to said line, a ringing trip relay responsive to the reclosure of said line to cause the release of said start relay whereby said source of ringing current is disconnected from said line, a timing device controlled by said first relay and a disconnect relay responsive to said timing device if said line is maintained open for more than a predetermined interval.

PAUL W. WADSWORTH.

REFERENCES CITED

The following references are of record in the file of this patent:

UNITED STATES PATENTS

| Number | Name | Date |
|---|---|---|
| 1,586,587 | Taplin | June 1, 1926 |
| 1,647,256 | Stokely | Nov. 1, 1927 |
| 1,864,061 | Gooderham | June 21, 1932 |
| 2,188,520 | Wochinger | Jan. 30, 1940 |